INVENTORS.
QUIRIN C. DELSMAN
KENNETH L. SURFUS
BY
Wheeler, Wheeler & Wheeler
ATTORNEYS Patented Apr. 1, 1952

2,591,411

UNITED STATES PATENT OFFICE 2,591,411

FORAGE BLOWER WITH PIVOTED FEED TROUGH

Quirin C. Delsman and Kenneth L. Surfus, Manitowoc, Wis., assignors to Smalley Manufacturing Company, Manitowoc, Wis., a corporation of Wisconsin Application March 25, 1949, Serial No. 83,452

8 Claims. (Cl. 302—37)

1

This invention relates to a forage blower with pivoted feed trough.

It is an object of the invention to provide a novel and improved arrangement whereby a forage blower with pivoted feed trough is so organized as to facilitate the folding of the trough respecting the blower during use and the folding of the blower respecting the trough for transportation, the driving connections of the feed screw in the trough being coaxial with blower shaft and including means for clutching the screw drive shaft in such a way as to assure the alignment of a universal joint axis with the transverse folding axis of the trough when the trough is to be folded.

More specifically, it is an object of the invention to provide a blower frame with an axle and wheels so positioned as to be out of contact with the ground during use of the blower and nevertheless available for transportation when the blower is to be transported, there being a feed trough pivoted to the frame and having a counter-balancing connection which assists in lifting the trough when the blower frame is in position for use and assists in lifting the blower when the blower frame is being tilted to position for transportation.

Another specific object of the invention is to provide the innermost of two coaxial shafts with a universal driving connection to the feed screw of the pivoted trough and, at a remote point, with a clutch which, when engaged, assures that one of the transverse universal axes will line up with the pivoting axis of the trough when the motion of the feed screw is arrested preliminary to the tilting of the trough.

Figure 1:
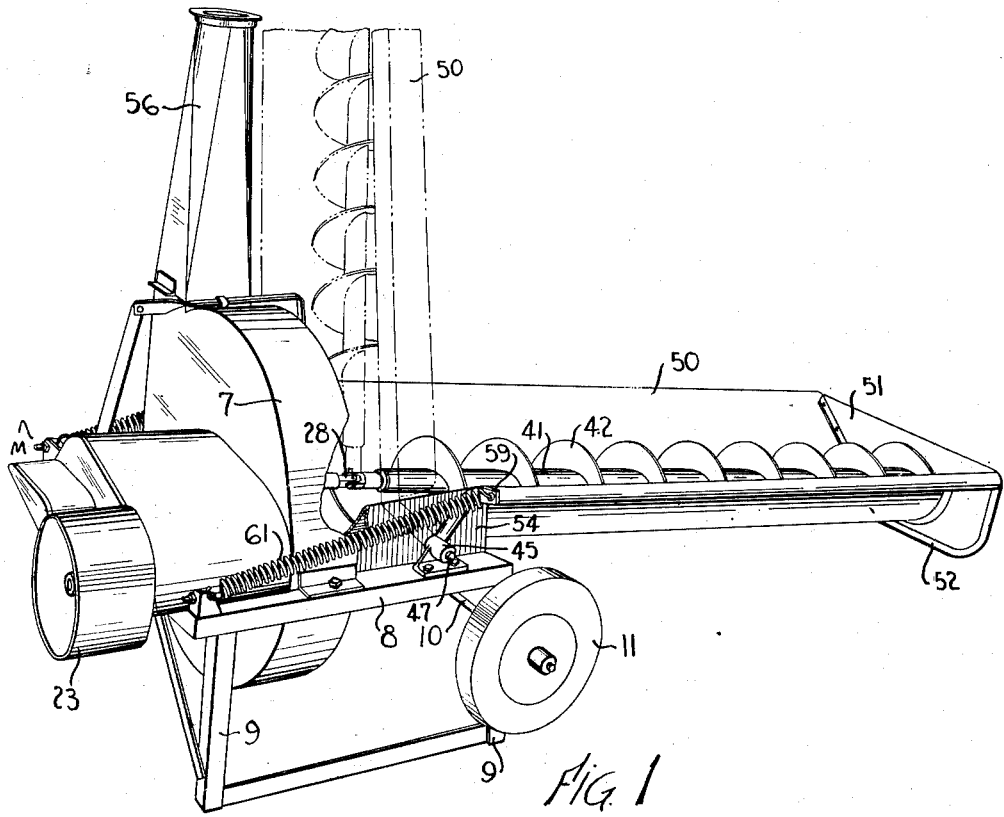
Fig. 1 is a view in perspective showing our device as it appears in position for use, a portion of the blower wall and blower feed table being broken away.

The blower housing 7 is mounted on a frame 8 which includes legs 9 and supports on its forward pair of legs an axle 10 having road wheels 11. The position of the axle is such that when the frame is in the position shown in Fig. 1, the several legs resting on the ground, the axle 10 and road wheels 11 are carried clear of the

2 ground. However, the frame 8 and blower housing 7 may be bodily tilted from the position of Fig. 1 to the position of Fig. 2 to rest upon, and be supported by, the axle 10 for transportation. When the device is to be transported, a tongue organization designated in Fig. 2 by reference character 12 is hooked over the axle and serves to provide connection with a towing vehicle.

Within the blower housing 7 is a fan 15 having a hub portion 16 mounted on a tubular shaft 17 which is carried in bearings 18 from the frame 8. A sprocket 19 on the tubular shaft 17 is driven by chain 20 from sprocket 21 on the pulley shaft 22, the latter being provided with a pulley at 23 for belt connection with a tractor or other extraneous source of power.

Figure 3:
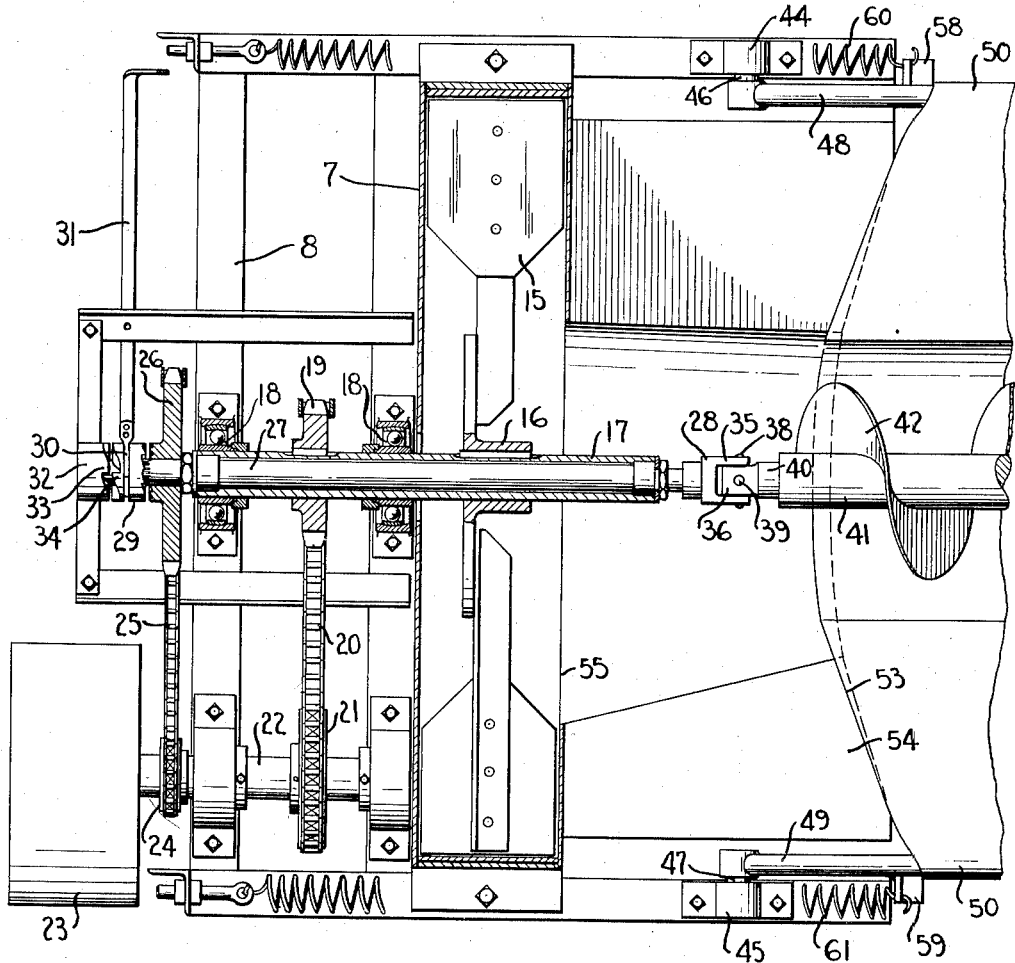
Fig. 3 is an enlarged detail view through the blower and portions of the feed trough in horizontal section.

Another sprocket at 24 on the pulley shaft 22 operates a chain 25 which, by means of sprocket 26, drives shaft 27 which is journaled within the sleeve shaft 17 and extends therethrough to a universal joint 28 for the actuation of the feed screw hereinafter described. Sprocket 26 is not made fast to the inner shaft 27 but is connected therewith only through the medium of the shiftable clutch collar 29. The collar and the hub of sprocket 26 have complementary teeth mating in the usual manner to transmit driving rotation of sprocket 26 to the clutch collar 29 and thence to shaft 27 when the collar is engaged with the hub of the sprocket. Fig. 3 shows the clutch collar in its intermediate or neutral position, permitting the sprocket 26 to idle on shaft 27. As is usual, the clutch collar 29 is peripherally grooved, being thereby adapted to receive the shifting fork 30 at the end of clutch shifting lever 31, whereby the clutch may be engaged and disengaged as desired.

Figure 4:
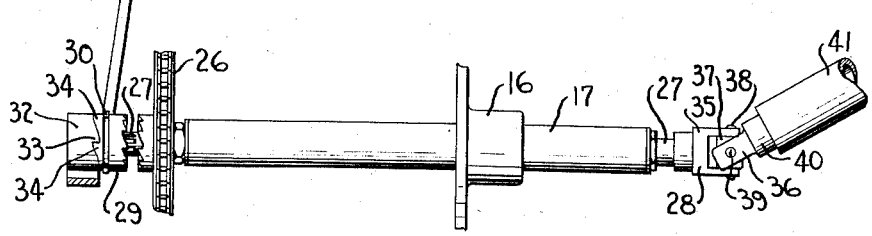
Fig. 4 is a diagrammatic view of the driving connections in side elevation.

Coaxial with shaft 27 is a stationary clutch element 32 fixed to the frame and provided with four jaws or teeth at 33, for which the collar has complementary jaws 34. When the collar is shifted beyond the neutral position of Fig. 3 into the ultimate position in which it is shown in Fig. 4, the driven shaft 27, to which the collar is splined, will be brought to rest positively at one of the four positions determined by the four jaw teeth meshing between the collar and the stationary clutch element 32, these positions having a significant relationship to the transverse pintles of the universal joint 28.

The universal joint 28 is of a conventional type comprising two bifurcated members 35 and 36 and an intervening block at 37 which is pivoted by pintle 38 to the member 35 and by pintle 39 to the member 36. As is customary, the two pintles are at right angles to each other and lie in the same transverse plane normal to the inner shaft 27. The driven member 36 of the universal joint has a shank 40 which is connected with the screw shaft 41 about which the screw flight 42 is wound in the conventional manner.

At transversely aligned points on the frame 8, in the same transverse plane in which the universal joint 28 is located, there are bearings at 44 and 45 for rock shafts 46, 47 from which the arms 48, 49 support the feed trough 50. The outer end of the feed trough is desirably closed as indicated at 51 and it may be provided with a supporting leg at 52 which, when the device is in position for use as shown in full lines in Fig. 1, rests directly upon the ground. When the device is to be transported as shown in Fig. 2, the leg 52 rests on the tongue 12, which is long enough to project slightly therebeyond.

Figure 2:
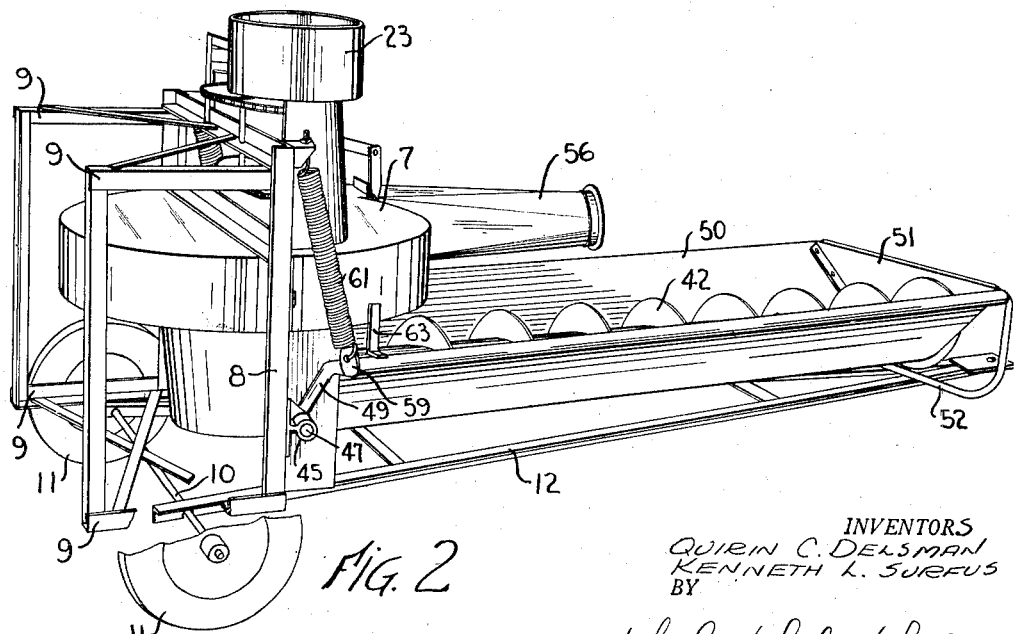
Fig. 2 is a perspective view showing the apparatus in position for transportation.

It will be observed that the open delivery end 53 of the feed trough 50 terminates at some distance outwardly from the fan housing 7, as is best shown in Fig. 1 and Fig. 3. When in position for use, however, it laps a stationary feed trough or feed table 54 which is carried by the frame 8 and leads to the eye or opening 55 through which the produce is admitted to the fan. The length of the stationary feed trough or feed table 54 is not so great but that any material therein will ordinarily be picked up by the air current entering the fan and discharged pneumatically through the fan outlet pipe 56. Thus it is not necessary that the feed trough 50, or the conveyor screw 42, extend beyond the point indicated.

The arms 48, 49 which support the feed trough from the frame are desirably provided at points well above the axes of rock shafts 46, 47 with brackets or ears 58, 59 which serve as anchorages for the tension springs 60, 61 connected to the frame. These springs are relatively powerful when distended as shown in Fig. 1 and Fig. 3 to provide a very substantial force tending to effect relative oscillation of the frame and trough about the common axis of the rock shafts 46, 47. While the springs exert a very considerable counterbalancing tension in the position in which the parts are shown in full lines in Fig. 1, the spring tension is relatively light, the coils being substantially fully contracted, in the relative position of the parts shown in Fig. 2. This latter position may be determined by stops 63 connected with the blower housing and engageable with the feed trough as shown in Fig. 2.

To avoid the necessity of backing up a truck or trailer loaded with produce for the purpose of discharging its contents through its tail gate onto the feed trough 50, the feed trough is raised from the full line position of Fig. 1 to the dotted line position shown in that view, thereby permitting the truck to pass to unloading position after which the trough is lowered to receive the discharged contents of the vehicle. Such raising is facilitated by the counterbalancing springs 60 and 61 and is made possible by the universal joint 28 and the stationary clutch element 33 with which the shiftable clutch collar 29 is engaged to define a rotative position of the screw driving shaft 27 such that one or another of the pintles 38, 39 will necessarily be aligned with the common axis of oscillation of the rock shafts 46, 47 upon which the trough pivots in moving from its lowered to its elevated position. Accordingly, each time the delivery of one load of produce through the blower has been completed, the clutch collar 29 will be shifted to disengage the feed shaft 27 from its driving sprocket 26 and to couple such shaft to the stationary clutch element 32 in a position assuring the proper indexing orientation of the universal joint. Thereupon the trough 50 is raised to permit another vehicle to be driven to its unloading position, the trough is lowered, and the clutch collar is moved from the position of Fig. 4 through the position of Fig. 3 into operative engagement with the driving sprocket 26, whereupon the screw is set in operation to receive the produce discharged from the newly positioned vehicle.

When the work is completed and the apparatus is to be removed from the point of use, the detachable tongue element 12 is coupled to its axle and the trough 50 is lowered onto the tongue element. The operator will then seize some convenient portion of the apparatus, as, for example, the projecting pulley 23 and, using this as a lever, he will lift the frame 8 to raise its legs 9 from the ground and to superpose its weight upon shaft 10 and the tongue 12. The engagement of the tongue by the cross bracing of the frame as shown in Fig. 2 locks the notched tongue on the axle. The stop members 63 also engage the feed trough for further support for the blower housing.

In this manipulation, the counterbalancing springs 60 and 61 which previously served to counterbalance the trough 50 in its pivotal movement now serve to counterbalance the frame in its pivotal movement. In both of the relative movements of the frame and trough as above described, it is important that one of the pintles of the universal joint be aligned with the axis of relative oscillation in the frame and trough and this is assured, in both cases, by engagement of the clutch collar 29 with the stationary clutch element 32 whose jaws register with the respective pintle positions to assure that the universal joint is properly indexed.

We claim:

1. A device of the character described comprising the combination with a frame and a feed trough in pivotal connection for relative oscillation, the frame being provided with stationary ground supports and with an alternatively useable wheel supported axle, the wheels and axle being disposed above the ground level when said frame is carried on said supports, the weight of the frame being shifted to the wheel supported axle upon the relative oscillation of the frame respecting the feed trough, the pivotal connection between the frame and the feed trough being adapted to permit of the elevation of the feed trough to permit the passage of a vehicle and being also adapted to accommodate the pivotal movement of the frame respecting the feed trough for the transfer of frame weight from said ground support to said wheel supported axle.

2. The combination set forth in claim 1 in which the feed trough is provided with a counterbalancing spring connection to the frame, the counterbalancing spring connection comprising means for counterbalancing the feed trough in the pivotal movement of the trough and for counterbalancing the frame in the pivotal movement of the frame.

3. The device of claim 2 in further combination with a tongue having means detachably engaged with the axle and of such length as to extend beneath the feed trough to a position near the remote end thereof for connection with a towing vehicle, the said feed trough having a support engageable with the tongue to rest thereon, and the feed trough and frame being provided with relatively engageable stop portions adapted when the frame rests on said wheel supported axle to sustain a portion of the frame weight from said tongue through said feed trough.

4. The combination set forth in claim 3 in which said frame is provided with a blower housing having an eye aligned with the feed trough, and a feed table fixed to the frame and leading from the feed trough to the blower housing eye.

5. The device of claim 4 in further combination with a blower operable in the blower housing and provided with a tubular shaft, an inner shaft extending through the tubular shaft and provided with a universal joint in the same transverse plane in which the trough has its pivotal connection with the frame, and a screw connected with said universal joint to receive motion therefrom and operatively mounted in the trough for propelling material therethrough toward said feed table and housing.

6. The device of claim 5 in further combination with driving connections to the respective shafts, the driving connection to said inner shaft including an idler on the shaft and a clutch element connected with the shaft and operatively movable thereon to and from coupling engagement with said idler, the said frame including a stationary clutch element with which the clutch element first mentioned is selectively engageable when disengaged from said idler, the said frame clutch element and the clutch element first mentioned having complementary teeth adapted to insure the proper orientation of said inner shaft and universal joint to permit the universal joint to pivot for accommodation of relative pivotal movement between said frame and trough.

7. A device of the character described comprising the combination with a forage crop blower including a housing, of a frame in which said housing is mounted, said frame including ground engaging portions upon which said frame rests when said blower is in use, an axle provided with wheels and mounted adjacent one end of the frame in a position such that said wheels are out of round contact when the frame rests upon said ground engaging portions, and a towing tongue in detachable pivotal connection with the frame, said frame being tiltable bodily with the said housing from a first position in which said ground engageable portions are in ground contact to a second position in which said frame is rotated approximately 90° to rest upon said axle and wheels, a portion of said frame including means engaging said tongue in the last mentioned frame position to receive support therefrom.

8. The device of claim 7 in which said tongue is provided at laterally spaced points with downwardly opening notches in which said axle is detachably received, the said notched tongue portions and axle providing the detachable pivotal connection of the tongue to the frame, and the weight of the frame superimposed in part on said tongue in the last mentioned frame position being adapted to maintain the tongue in engagement with said axle.

QUIRIN C. DELSMAN.
KENNETH L. SURFUS.

REFERENCES CITED

The following references are of record in the file of this patent:

UNITED STATES PATENTS

| Number | Name | Date |
|---|---|---|
| 1,237,212 | Loewen | Aug. 14, 1917 |
| 2,180,838 | Saiberlich | Nov. 21, 1939 |
| 2,324,042 | Swenson | July 13, 1943 |
| 2,373,169 | Coultas | Apr. 10, 1945 |
| 2,447,300 | Williams | Aug. 17, 1948 |